(12) United States Patent
Zhang et al.

(10) Patent No.: US 7,948,729 B2
(45) Date of Patent: May 24, 2011

(54) METHOD AND CIRCUIT FOR OVER-CURRENT PROTECTION

(75) Inventors: Xiaoyong Zhang, San Jose, CA (US); Takashi Kanamori, San Jose, CA (US)

(73) Assignee: Summit Microelectronics, Inc., Sunnyvale, CA (US)

(*) Notice: Subject to any disclaimer, the term of this patent is extended or adjusted under 35 U.S.C. 154(b) by 152 days.

(21) Appl. No.: 12/494,062

(22) Filed: Jun. 29, 2009

(65) Prior Publication Data

US 2010/0328831 A1    Dec. 30, 2010

(51) Int. Cl.
    *H02H 9/02* (2006.01)
(52) U.S. Cl. .................... 361/93.9; 361/93.7
(58) Field of Classification Search ............ 361/18, 361/93.7–93.9
    See application file for complete search history.

(56) References Cited

U.S. PATENT DOCUMENTS 5,694,305 A * 12/1997 King et al. ............... 363/21.11
7,791,297 B2 * 9/2010 Mueller et al. ............ 318/434

* cited by examiner

*Primary Examiner* — Danny Nguyen
(74) *Attorney, Agent, or Firm* — Chad R. Walsh; Fountainhead Law Group PC

(57) ABSTRACT

In one embodiment the present invention includes an over-current protection method. The method comprises generating a switching signal, starting and stopping a timer, sensing a current through a switch, comparing a response time to a reference time, and generating an over-current alarm signal. The switching signal activates one or more switches in a switching regulator. The timer is started in response to the switch being activated and is stopped in response to the sensed current exceeding a threshold. The response time indicates the time period between the starting and the stopping of the timer. The over-current alarm signal is generated if the response time is less than the reference time.

14 Claims, 3 Drawing Sheets

METHOD AND CIRCUIT FOR OVER-CURRENT PROTECTION

BACKGROUND

The present invention relates to current limiting, and in particular, to a method and circuit for over-current protection.

Current limit protection is very important in power supply systems. In pulse width modulated (PWM) switching power supply systems, excessive inductor current may cause thermal damage. Additionally, the excessive current may cause the inductor to become saturated and cause catastrophic failure. For example, the switches of the switching power supply may be permanently damaged. Limiting the current protects power supply system components and may improve overall system reliability.

Conventional methods of current limit protection for switching power supply systems may include detecting the current. During the periodic detecting of the current, the switch may incrementally increase the inductor current. This may cause a run-away condition in which the inductor becomes saturated and the over-current causes system failure.

Thus, there is a need for improved over-current protection. The present invention solves these and other problems by providing method and circuit for over-current protection.

SUMMARY

Embodiments of the present invention improve methods and circuits for over-current protection. In one embodiment, the present invention includes an over-current protection method. The over-current protection method comprises generating a switching signal, starting a timer, sensing, stopping the timer, comparing a response time to a reference time, and generating an alarm signal. The switching signal activates one or more switches in a switching circuit. The starting of the timer includes starting the timer in response to a switch being activated. The sensing includes sensing a current passing through the switch. The stopping includes stopping the timer in response to the sensed current exceeding a threshold. The response time indicates the time period between the starting and the stopping of the timer. The generating the alarm signal includes generating the alarm signal if the response time is less than the reference time.

In one embodiment, the method further comprises stopping the switching signal in response to the alarm signal.

In another embodiment, the method further comprises deactivating the switch in response to the alarm signal.

In yet another embodiment, the deactivating occurs for a number of switching periods.

In one embodiment, the method further comprises activating a second switch in response to the alarm signal. The activating of the second switch allows an inductor, which was charged by the switch being activated, to be discharged into a load.

In another embodiment, the switching circuit is a switching regulator.

In one embodiment, the current invention includes an over-current protection circuit. The over-current protection circuit comprises a switch controller, a timer, and a first circuit. The switch controller generates a switching signal. The switching signal activates one or more switches in a switching circuit. The timer is started in response to a first switch being activated and the timer is stopped in response to a sensed current exceeding a threshold. The first circuit compares a response time from the timer to a reference time. The response time indicates the time period between the starting and the stopping of the timer. The first circuit generates an alarm signal if the response time is less than the reference time.

In one embodiment, the switch controller stops the switching signal in response to the alarm signal.

In another embodiment, the switch controller deactivates the first switch in response to the alarm signal.

In yet another embodiment, the switch controller maintains the first switch deactivated for a number of switching periods.

In one embodiment, the over-current protection circuit further comprises a second switch coupled through an inductor to a load. The second switch is activated in response to the alarm signal.

In another embodiment, the first circuit, the switch controller, and the timer are integrated on a single integrated circuit.

In another embodiment, the over-current protection circuit further comprises an amplifier and a comparator. The amplifier senses a voltage across the first switch. The comparator receives an amplified signal from the amplifier corresponding to the sensed current. The comparator compares the amplified signal to a threshold voltage. The comparator is coupled to provide a resultant signal to the switch controller and the timer.

In yet another embodiment, the first circuit is a digital circuit.

The following detailed description and accompanying drawings provide a better understanding of the nature and advantages of the present invention.

DETAILED DESCRIPTION

Described herein are techniques for a method and a circuit for over-current protection. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
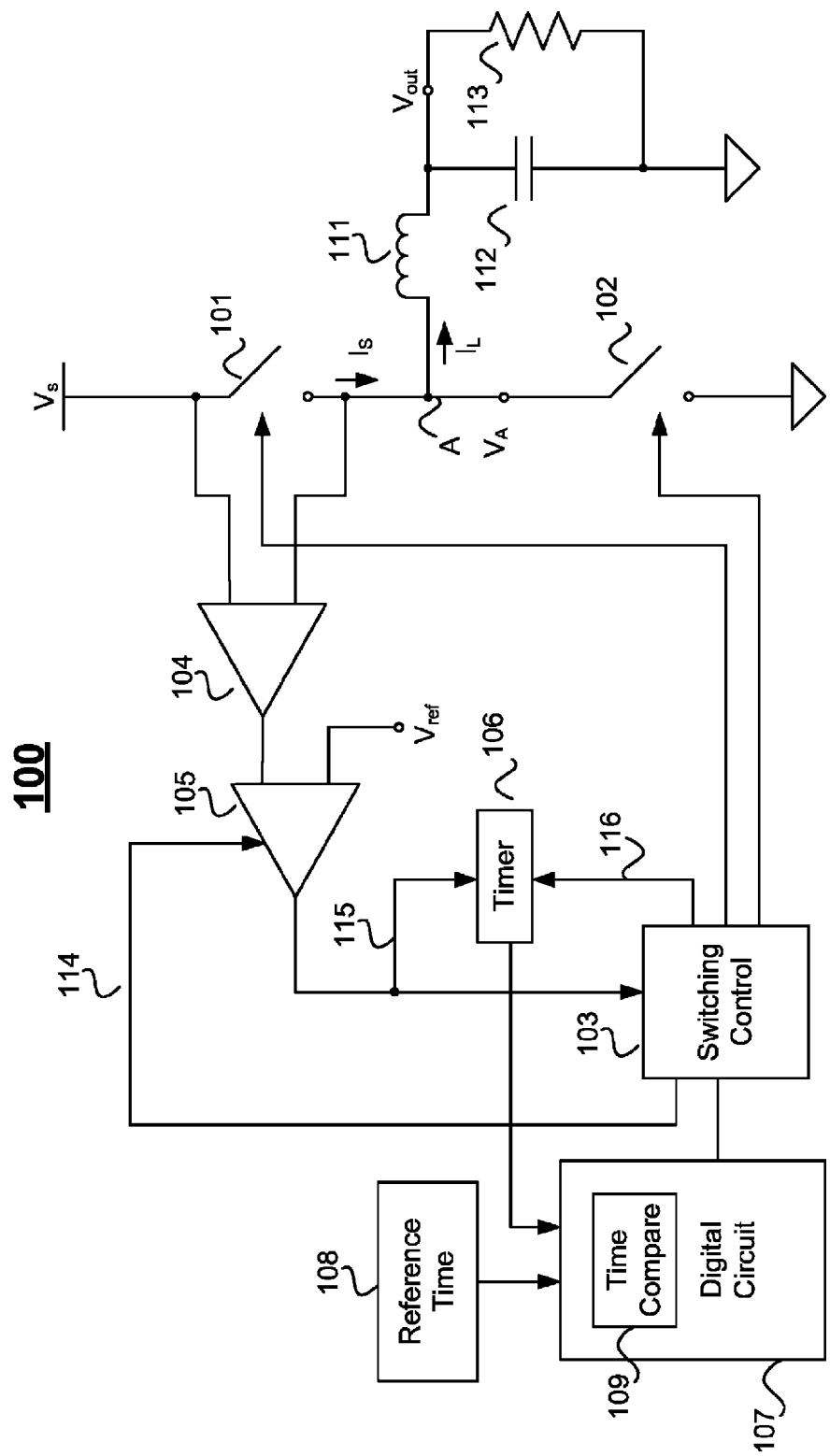
FIG. 1 illustrates an over-current protection circuit according to one embodiment of the present invention.

FIG. 1 illustrates a circuit 100 including over-current protection according to one embodiment of the present invention. Circuit 100 may include a switching regulator, for example, including switch 101, switch 102, switching controller 103, inductor 111, and capacitor 112, for example. Switches 101 and 102 may be MOS transistors, for example. The switching regulator may further include a feedback control network, which is not shown. Over-current conditions in the switching system may be controlled by an over-current protection circuit. In this example, the over-current protection circuit includes amplifier 104, comparator 105, timer 106, and digital circuit 107. The timing of an over-current (OC) event is used to generate an over-current alarm signal.

In this example, switch 101-102 and switching controller 103 form a PWM switching regulator circuit. Switch 101 is coupled between reference voltage Vs and an intermediary circuit node A. Switch 102 is coupled between the intermediary circuit node A and a second reference voltage (e.g. ground). The intermediary node A is also coupled to a load comprising inductor 111 coupled between node A and an output terminal. The output terminal is also coupled to one terminal of both capacitor 112 and load 113. Load 113 is illustrated here as a resistor. The other terminals of capacitor 112 and load 113 are coupled to a third reference voltage (e.g. ground). Switching controller 103 controls the switching of switch 101-102 to deliver a voltage $V_{out}$ to the output terminal. In some embodiments, $V_{out}$ may be fedback to switching controller 103 to control the voltage $V_{out}$ more accurately using a feedback network (e.g., a resistor divider) as mentioned above. When switch 101 is activated (i.e., closed) and switch 102 is deactivated (i.e., open), current $I_S$ corresponds to current $I_L$ passing through inductor 111. Over-current levels of current $I_L$ may be sensed by sensing current $I_S$ when switch 101 is activated.

One example over-current circuit for maintaining the current in inductor below a specified level may be implemented using amplifier 104, comparator 105, timer 106, and digital circuit 107. Amplifier 104 and comparator 105 may be used to detect conditions where the current in the inductor is above a threshold level. The output of comparator 105 may be used for current limiting for controlling moderate loading that causes the inductor current to increase above a threshold level. Additionally, the output of comparator 105, together with timer 106 and digital circuit 107 may be used to prevent runaway current conditions as described below.

Amplifier 104 senses the current $I_S$ flowing though switch 101 when switch 101 is activated. For example, amplifier 104 may receive a voltage (e.g., Vdiff=$I_S$*Rdson, where Rdson is the resistance of the switch when activated), and amplify the input voltage (e.g., Vo=Av*Vdiff). Comparator 105 compares the amplified signal corresponding to current $I_S$ to threshold voltage $V_{ref}$. $V_{ref}$ may correspond to a specified maximum current $I_S$ (i.e., a current limit), which may be preset or programmed (e.g., using an DAC). When the current $I_S$ increases past a maximum current, a corresponding signal from amplifier 104 may increase above threshold voltage, $V_{ref}$, and change the state of comparator 105. In one embodiment, the output of comparator 105 is received by switching controller to limit the current. Additionally, one embodiment of the present invention detects runaway over-current conditions that may not be correctable using switching controller 105. Runaway over-current conditions may be detected by measuring the time between the closing of switch 101, for example, and the triggering of comparator 105. The time between the closing of an output switch and the triggering of a comparator may indicate that the current is rising very quickly. Such a condition may indicate a current runaway condition, for example.

Figure 2:
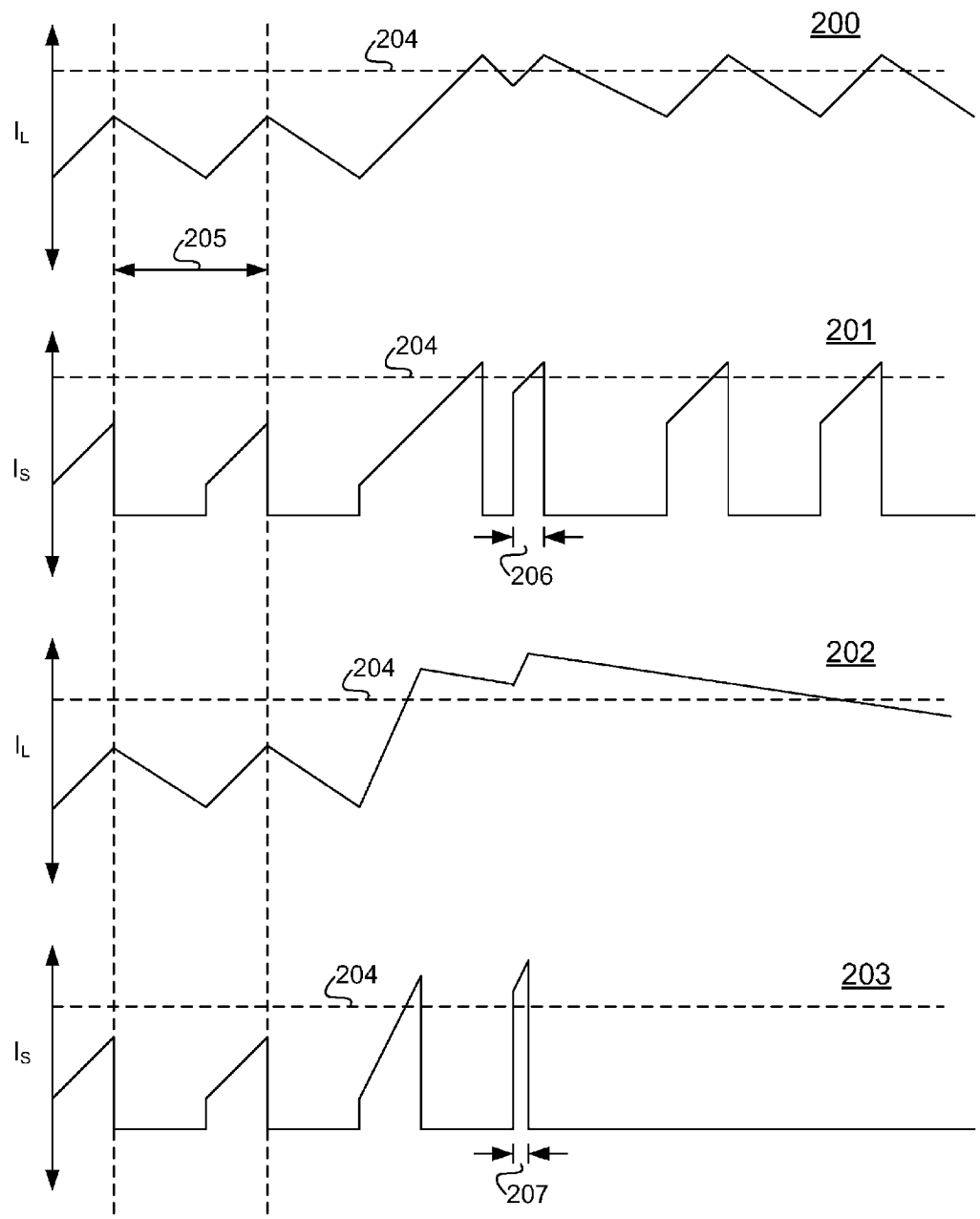
FIG. 2 illustrates a set of graphs showing two alternate scenarios of operation associated with the over-current protection circuit of FIG. 1.

The operation of the over-current protection circuits of FIG. 1 is described with reference to the plots shown in FIG. 2. FIG. 2 illustrates a set of graphs 200-203 showing two alternate scenarios of over-current protection associated with the over-current protection circuit of FIG. 1. Graphs 200-201 show a scenario in which the switching circuit of FIG. 1 experiences a moderate load current at its output (e.g. Vout is pulled down to 80% of its nominal value) and graphs 202-203 show a scenario in which switching circuit of FIG. 1 experiences a near short at its output (e.g. $V_{out}$=0.1V).

Graph 200 shows an inductor current $I_L$ waveform over time and graph 201 shows a current $I_S$ waveform over time. Initially, the switching circuit operates with a cycle 205 and then experiences a current load which increases the current $I_S$ past current limit 204 (i.e. an OC event). As the current in the inductor 111 increases, the current in switch 101 also increases during times when switch 101 is closed. As illustrated in graph 201, the current current $I_S$ increases above the current limit 204 at the same time the inductor current exceeds the current limit. The current $I_S$ is translated into a voltage by amplifier 104 and compared to a reference voltage, Vref, by comparator 105. The reference voltage, Vref, is set trigger the comparator when the current $I_S$ is equal to the current limit 204.

$$Vref=Av*Rdson*I_{S\_MAX}$$

The output of comparator 105 is coupled to switching controller 103. As illustrated in graph 201, when the current in switch 101 increases to the current limit, the output of comparator triggers and switching controller 103 deactivate switch 101 and may activate switch 102 to reduce the current in the inductor. At the beginning of the next cycle, switch 102 is deactivated and switch 101 is reactivated. Once again the inductor current $I_L$ passes current limit 204, and the cycle repeats. In this scenario, the load does not put the switching circuit into a non-recoverable situation. Under a moderate over-current condition, the time switch 101 is off is sufficient for the inductor current to reduce back below the current limit value and prevent runaway.

Features and advantages of the present invention further prevent a runaway over-current condition. Runaway over-current conditions may occur under heavy current loads. For example, in the event the $V_{out}$ is shorted to ground (or $V_{out}$ is close to 0V), the current through switch 101 may increase to the current limit as described above. However, in a typical switching circuit, the top side switch (e.g., switch 101) may not be permanently turned off. Rather, on each cycle, switch 101 may turn on for a minimum period of time. Each time switch 101 turns on, it further increases the current in the inductor by an incremental amount. The problem is that the bottom side switch (e.g., switch 102) may not be able to reduce the current by a sufficient amount on each cycle to result in a net reduction of inductor current across the whole cycle. In other words, if the inductor current is at the current limit, and if the top side switch is ON for a minimum time each cycle that increases the current further by an incremental amount, then the bottom side switch must be able to reduce the inductor current by at least the amount of the incremental increase or the current will increase incrementally each cycle (runaway) and lead to catastrophic failure.

Returning to the example above, where Vout is grounded, it can be seen that when switch 102 is closed, there may not be enough product of voltage (i.e. ($V_{out}$–$V_A$)) and time (i.e. T(switch 102 activated)) to recover from the inductor current increase. Specifically, if $V_{out}$ is 0.1V and switch 101 is deactivated and switch 102 is activated, the voltage difference across inductor 111 may be 0.1V and may provide little energy transfer to reduce the current within a cycle of operation. If the inductor current is at the current limit, and if switch 101 is be activated on the next cycle of operation, the current may be increased by an incremental amount that is greater than the current reduction via switch 102. The current increase may be exacerbated by the voltage drop across inductor 111 which may increase the current further. In other words, not only can the net inductor current increase each cycle, but the amount of each increase can grow over cycles. An example of the amount of incremental increase in current is described below.

Switch 101 of FIG. 1 may be activated to sense the inductor current. During activation, input voltage $V_{in}$ may charge inductor 111 to a higher current level. When $V_{out}$ is about 0V, the minimum increment of the inductor current for a minimum turn-on time is as follows:

$$I\Delta = \frac{V_{in}}{L} * (T_{blanking} + T_{delay}) = \frac{V_{out}}{D*L} * (T_{blanking} + T_{delay})$$

$$I\Delta = \frac{V_{out}}{L} * \frac{1}{D} * (T_{blanking} + T_{delay}) \approx$$

$$0.4 * I_{fullload} * \frac{1}{(1-D)*D} * (T_{blanking} + T_{delay}) * \frac{1}{T}$$

Assuming T=1 us for a 1 Mhz switching, and $T_{blanking} + T_{delay} \approx 0.1$ us, the following table values result.

TABLE 1

| Duty Cycle (%) | $I_\Delta$ for minimum top side turning on ($\times I_{fullload}$) |
|---|---|
| 0.12 | 0.38 |
| 0.15 | 0.31 |
| 0.2 | 0.25 |
| 0.25 | 0.21 |
| 0.3 | 0.19 |
| 0.4 | 0.17 |
| 0.5 | 0.16 |

$I_\Delta$ minimum values, $0.16 * I_{fullload}$, occurs when the duty cycle, D, is 0.5.

If $V_{out}$ is shorted to ground, three consecutive cycles of switch 101 activating will increase the inductor current by around ($0.93 * I_{fullload}$). Deactivating switch 101 and activating switch 102 will not reduce the inductor current below the current limit. If the inductor current had already reached the current limit ($1.5 * I_{fullload}$) at the first cycle, then the total inductor current may be at $$(1.5+0.93) * I_{fullload} = 2.43 * I_{fullload}$$

This current level may saturate inductor and induce circuit failure. In this case, the over-current alarm signal described below may be used to shutdown the circuit 100 in order to protect any circuitry which may be damaged by runaway over-current.

Features and advantages of the present invention further include preventing runaway scenarios. Referring again to FIG. 1, it is noted that the minimum turn-on time of switch 101, described above, is related to two delays. First, after switch 101 is activated, there is a blanking period where comparator 105 is inactive (turned off) so that switching transients do not result in a false over-current alarm to the switching controller 103. Accordingly, there is a period of time, $T_{blanking}$, between the activation of switch 101 and the activation of comparator 114 (e.g., by switch controller 103 via line 114) during which the top side switch is always activated on each cycle. Additionally, once the comparator is activated, there is another circuit delay ($T_{delay}$) between the time the comparator is activated and the time the comparator generates an output during which the top side switch is always activated on each cycle. For example, if the blanking period ($T_{blanking}$) is between 20-60 ns and the circuit delay time for a comparator is another 20-30 ns, then switch 101 activates for at least 40-90 ns ($T_{on\_minmum} = T_{delay} + T_{blanking}$) for each cycle before an over-current alarm may be sent to switching controller 103. In a runaway condition, the inductor current $I_L$ continues ramping up during this period based on the voltages and time:

$$(V_S - V_{out}) * (T_{on\_minmum})$$

In order to recover, a greater reverse voltage and/or time to reduce the inductor current should be applied across the inductor:

$$(V_S - V_{out}) * T_{on\_minmum} < (V_{out} - V_A) * T(\text{switch 102 activated}),$$

where $T_{on\_minmum}$ is about 40-90 ns, $V_A$ is the voltage at node A when switch 102 is active, which is equal to the $-I_L * R_{dson}$, and $R_{dson}$ is the ON resistance of switch 102. Alternatively, switch 102 may be a diode, such as a body diode or Schottky diode, and $V_A$ may be the voltage drop of the diode when current flows from ground to Vout. T(switch 102 activated) is the time required to activate switch 102 to recover from the inductor current increase.

From the above description, it can be seen that runaway over-current conditions can be inferred if the output of the comparator is triggered immediately after the blanking period and circuit delay. For instance, in a runaway condition, the comparator would trigger immediately after switch 101 is activated because the inductor current is already above the current limit. Accordingly, embodiments of the present invention detect an over-current condition and further measure the time of the over-current condition. If the time the over-current condition is generated is at or near a minimum threshold time (e.g., the blanking and circuit delay time of comparator 105), then the system may execute process to eliminate all current to the inductor for a number of cycles. For example, at the beginning of a potential runaway condition, switch 101 may be activated during a switching cycle. If the inductor current is at (or very near) the current limit, the comparator 105 will trigger immediately (or very shortly after) the comparator is activated (e.g., after the blanking time and delay time described above). In one embodiment, the timing of the comparator trigger may be measured by signaling a timer 106 when switch 101 is activated and signaling timer 106 again when the comparator triggers. The time between the activation of switch 101 and the triggering of comparator 105 may be compared to a reference time 108. If the time between the activation of the switch 101 and the triggering of comparator 105 is less than the reference time 108, then the system may generate a runaway over-current alarm and eliminate all current to the inductor for a number of cycles so that the current is reduced by a safe amount.

In one embodiment, timer 106 is a counter, which may be started when switch 101 is activated and stopped when the comparator 105 is triggered. The response time between the starting and the stopping of timer 106 may be communicated to digital circuit 107. A digital time compare circuit 109 may compare the response time from timer 106 (e.g., the counter output) with reference time 108. The reference time 108 may represent the minimum time necessary to prevent a runaway current condition. For example, the reference time may represent the closest the inductor current may be to the current limit, immediately after switch 101 is activated, and still be able to recover. For example, the reference time may be estimated to be 150 ns. Any response time that is less than 150 ns (reference time) may be considered to be a condition of a heavy load in which the inductor current $I_L$ increase cannot be recovered and therefore a runaway over-current alarm signal may be generated.

The runaway over-current alarm signal may be used by switch controller 103 to deactivate switch 101 for several cycles, for example. The over-current alarm signal may be used by switch controller 103 to deactivate switch 101 and activate switch 102 for a time period in order to discharge inductor 111. The over-current alarm signal may be used to shutdown or disable switch controller 103. The over-current protection circuit 100 may latch the state of switch 101 such that the input power $V_S$ may need to be recycled in order to reset the circuit.

Graphs 202 and 203 illustrate a runaway condition. In this example, circuit 100 of FIG. 1 experiences a near short at its output (e.g. $V_{out}$=0.1V). Graph 202 shows an inductor current $I_L$ waveform over time and graph 203 shows a current $I_S$ waveform over time. Initially circuit 100 operates with a cycle 205 and then experiences a near short circuit which increases the current $I_S$ past current limit 204 (i.e. an OC event). In response to the OC event, switch 101 is deactivated and switch 102 is activated. In this case, inductor current $I_L$ does not reduce below the current limit during the remainder of the cycle where switch 101 is inactive and switch 102 is active. At the beginning of the next cycle, switch 102 is deactivated and switch 101 is reactivated. The inductor current $I_L$ remains above the current limit 204 such that when switch 101 is reactivated, the sensed current $I_S$ (graph 203) passes current limit 204. The circuit delays (and possibly a blanking period) allow for current $I_S$ to increase for a period 207.

The blanking period and circuit delays result in a minimum ON time 207 as described above. In this case, comparator 105 will trigger after time 207, which may be less than the reference time 108 of FIG. 1. Therefore, digital circuit 107 of FIG. 1 may generate a runaway over-current alarm signal. This signal may turn off or disable the sending of switching signals to activate switch 101. This condition may be latched such that the circuit may need to cycle reference voltage $V_S$ in order to reset the circuit. Alternately, the switch controller 103 may be disabled for a number of cycles or a period of time.

Figure 3:
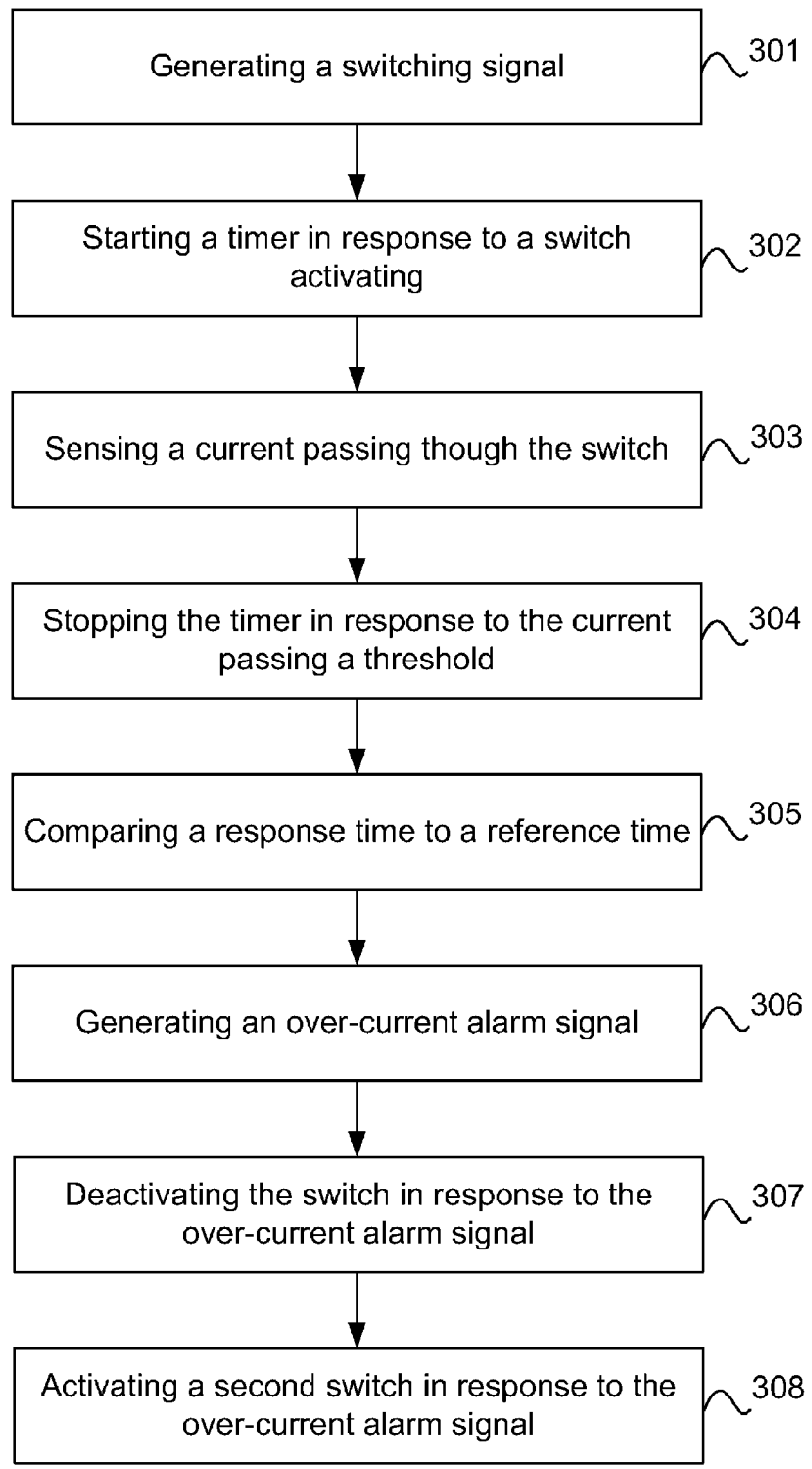
FIG. 3 illustrates an over-current protection method according to one embodiment of the present invention.

FIG. 3 illustrates an over-current protection method 300 according to one embodiment of the present invention. At 301, a switching signal is generated. The switching signal may be PWM signal which is used to control a switch like switch 101 of FIG. 1, for example. At 302, a timer is started in response to a switch being activated. The activated switch may be allowing an inductor to be charged when activated. At 303, a current passing through the switch is sensed. At 304, the timer is stopped in response to the current passing a threshold (or current limit). At 305, the response time in the timer is compared to a reference time. The reference time may correspond to the minimum response time in which a circuit may recover from an OC event. Any response time less than the reference time may indicate a possible runaway condition in which the current in the inductor may continue to rise every cycle and cause circuit failure and/or damage. At 306, an alarm signal is generated if the response time is less than the reference time. At 307 the current supplied to the inductor is halted. For example, the switch may be deactivated in response to the alarm signal. The deactivating may discontinue the flow of current and protect the circuit producing the current as well as circuitry being supplied the current. The disabling of the output current to the inductor may be programmable, for example, to control the number of cycles that the inductor current is halted. At 308 a second switch may be activated in response to the alarm signal. This switch may be used to discharge a load inductor, for example. Switch 102 of FIG. 1 is one example of a switch which may be activated to discharge a circuit in order to recover from an OC event.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An over-current protection method comprising:
   generating a switching signal, said switching signal activating one or more switches in a switching circuit;
   starting a timer in response to a switch being activated;
   sensing a current passing through said switch;
   stopping said timer in response to said sensed current exceeding a threshold;
   comparing a response time from said timer to a reference time, wherein said response time indicates the time period between said starting and said stopping of said timer; and
   generating an alarm signal if the response time is less than the reference time.

2. The method of claim 1 further comprising stopping said switching signal in response to said alarm signal.

3. The method of claim 1 further comprising deactivating said switch in response to said alarm signal.

4. The method of claim 3 wherein said deactivating occurs for a number of switching periods.

5. The method of claim 4 further comprising:
   activating a second switch in response to said alarm signal, wherein said activating of said second switch allows an inductor, which was charged by said switch being activated, to be discharged into a load.

6. The method of claim 1 wherein the switching circuit is a switching regulator.

7. An over-current protection circuit comprising:
   a switch controller generating a switching signal, said switching signal activating one or more switches in a switching circuit;
   a timer, wherein said timer is started in response to a first switch being activated and said timer is stopped in response to a sensed current exceeding a threshold; and
   a first circuit to compare a response time from said timer to a reference time, wherein said response time indicates the time period between said starting and said stopping of said timer,
   wherein said first circuit generates an alarm signal if the response time is less than the reference time.

8. The circuit of claim 7 wherein said switch controller stops said switching signal in response to said alarm signal.

9. The circuit of claim 7 wherein said switch controller deactivates said first switch in response to said alarm signal.

10. The circuit of claim 9 wherein said switch controller maintains said first switch deactivated for a number of switching periods.

11. The circuit of claim 7 further comprising a second switch coupled through an inductor to a load, wherein said second switch is activated in response to said alarm signal.

12. The circuit of claim 7 wherein said first circuit, said switch controller, and said timer are integrated on a single integrated circuit.

13. The circuit of claim 7 further comprising:
   an amplifier to sense a voltage across the first switch; and
   a comparator coupled to receive an amplified signal from said amplifier corresponding to said sensed current,
   wherein said comparator compares said amplified signal to a threshold voltage, and
   wherein said comparator is coupled to provide a resultant signal to said switch controller and said timer.

14. The circuit of claim 7 wherein said first circuit is a digital circuit.

* * * * *